United States Patent

[11] 3,613,496

| [72] | Inventor | Lee Triplett<br>2878 South 860 West, Magna, Utah 84044 |
|---|---|---|
| [21] | Appl. No. | 22,494 |
| [22] | Filed | Mar. 25, 1970 |
| [45] | Patented | Oct. 19, 1971 |

[54] FERRULE-TYPE FRICTION LOCK DEVICE
9 Claims, 5 Drawing Figs.

[52] U.S. Cl. .................................................. 85/69, 85/70
[51] Int. Cl. .................................................. F16b 13/06
[50] Field of Search .................................. 85/70, 71, 77, 74, 73, 63, 78, 50, 1 JP, 69; 287/124, 20.3

[56] References Cited
UNITED STATES PATENTS

| 3,017,800 | 1/1962 | Cohen | 85/70 |
| 1,919,666 | 7/1933 | Patterson | 85/69 X |
| 2,277,885 | 3/1942 | Rodanet | 85/70 |
| 2,430,737 | 11/1947 | Roe | 85/69 X |
| 3,452,636 | 7/1969 | Cohen et al. | 85/1 JP |
| 3,492,909 | 2/1970 | Triplett | 85/70 |

FOREIGN PATENTS

| 892,870 | 4/1962 | Great Britain | 85/1 JP |
| 866,258 | 4/1961 | Great Britain | 85/70 |

*Primary Examiner*—Ramon S. Britts
*Attorney*—M. Ralph Shaffer

ABSTRACT: The present invention comprises a friction lock attachment device for use in releasably attaching a given member to a support, and this in a manner such that the attaching device need not be disassembled for mounting purposes or manipulated at its rear threaded connection. In the device, a unique ferrule is employed, the reacting surface of which, abutting the shouldered surface of a bolthead, is chamfered or tapered such that only the inner circumferential edge of said surface engages the undersurface of the bolthead used. Bearing friction between the bolthead of the securement bolt and such ferrule surface is thus reduced to an absolute minimum, ensuring that the friction lock attachment device is properly tightened, and this in a manner such that the ferrule, designed for wedging into such given member, will not turn upon such tightening process. Various embodiments of the invention illustrate the ferrule in a number of useful forms.

PATENTED OCT 19 1971　　3,613,496
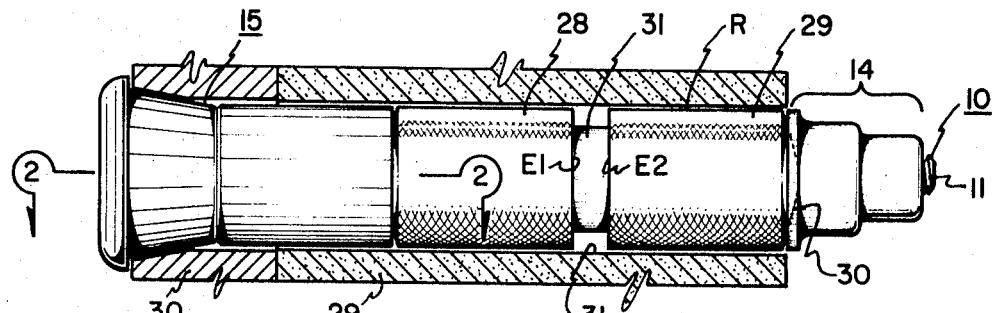
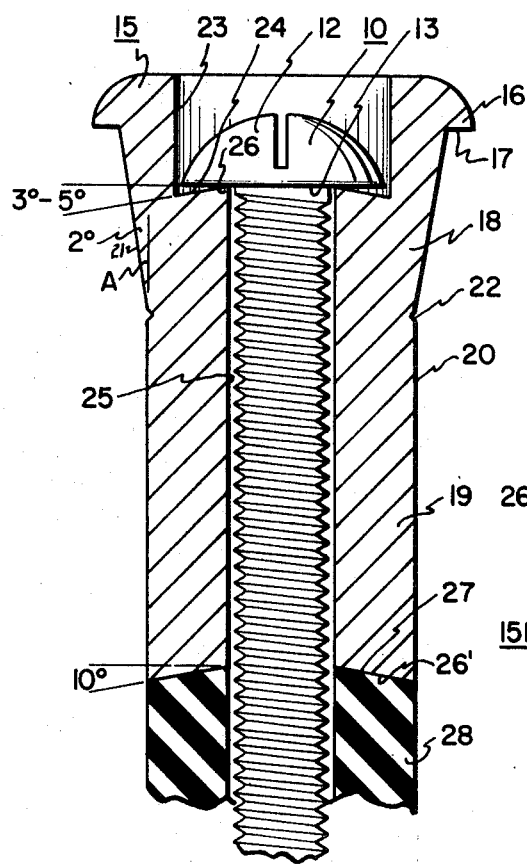
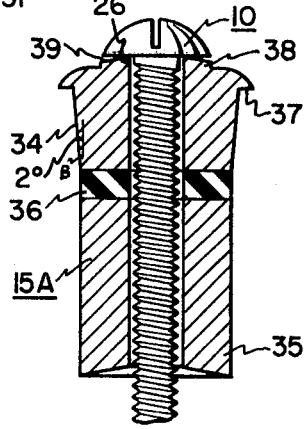
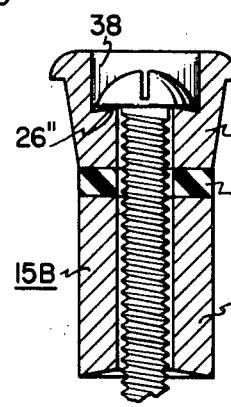
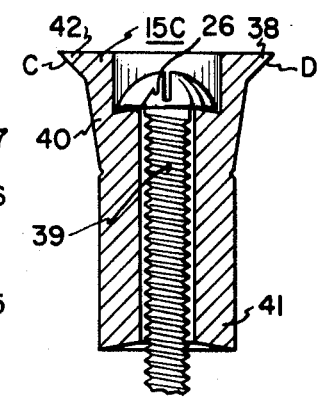
FIG. 1
FIG. 2
FIG. 3
FIG. 4
FIG. 5
INVENTOR.
Lee Triplett
BY M. Rudolph Shaffer
His Attorney

FERRULE-TYPE FRICTION LOCK DEVICE

The present invention relates to friction lock attachment devices and, more particularly, to a new and improved friction lock attachment member incorporating a ferrule which is of such a design as to facilitate easy tightening of the device for installation purposes, at the same time ensuring that the ferrule will not turn during such tightening.

In the past, there have been devised a number of different types of friction lock attachments for releasably securing one member to another in a desired physical arrangement. Prior devices have been deficient in some respects, especially those including rigid members for disposition underneath the bolt or screwhead of the device in question. Heretofore, such members have been required to be held in place with spanner wrenches or other devices in order that the attachment device may be tightened down appropriately. Likewise, in prior designs, difficulties have been incurred in satisfactorily retaining the nut of the device so that the bolt, when turned, will actually thread through the nut so as to draw the nut upwardly to compress appropriately the friction sleeve means of the device.

In the present invention, the friction lock attachment device includes a bolt, and nut, a ferrule disposed underneath the head of the bolt, and friction sleeve means interposed between such ferrule and the nut. In practice, the assembly can initially be made up and retained during the entire installation process. In various embodiments of the invention the ferrule is illustrated as having a recessed head receiving the head of the bolt employed, or a head having an exposed bolthead feature. Countersunk or flush arrangements are possible as hereinafter shown in the drawings. In all embodiments, there is the common feature of having a ferrule head which is chamfered or tapered such that only the inner edge of such surface surrounding the bolt-receiving bore of the ferrule engages the underside of the head of the bolt; in this way, frictional bearing contact as between the bolthead of the bolt of the device and the bearing surface of the ferrule is reduced to an absolute minimum. This ensures the turning of the bolt will not chance to turn the ferrule and, further, ensures that the nut is sufficiently retained against tendencies of rotational involvement. This ensures that the device can be completely actuated in blind installations, and so forth.

In a preferred form of the invention, appropriate spacer means of reduced diameter are used as between adjacent friction lock compression sleeves so that there will be a biting or a wedging of the associated ends of the sleeve around such spacer to further enhance the gripping action of the device.

The ferrule of the invention is likewise tapered so as to provide a wedging effect as between any attachment member to be releasably secured to support structure and such ferrule. The flared or tapered portion of the ferrule should approximate an angular magnitude of about 2° relative to the cylindrical surface of the remainder of the ferrule. As to the bearing surface of the ferrule contacting the bolthead of the bolt used, the same should be tapered at approximately 3°–5° pitch relative to the plane of the bolthead shoulder or undersurface. If greater than a 5° angle is used, then the bearing surface will tend to dig into, scar or mar the underside of the bolthead. If an angle less than 3° is employed, then the frictional drag as between the bolthead and the ferrule reaction surface is too great to ensure that the ferrule will not be turned upon the complete torquing of the bolt.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is an elevation of the friction lock attachment device of the present invention.

FIG. 2 is an enlarged detail shown principally in section and taken along the line 2—2 in FIG. 1.

FIG. 3 is a fragmentary view of the ferrule portion of the device in an alternate embodiment of the present invention.

FIGS. 4 and 5 are transverse, vertical sections similar to FIGS. 2–4, illustrating additional embodiments of the invention as to the ferrule portion of the device.

In FIGS. 1 and 2, the bolt 10 includes a threaded shank 11 and a head 12 integral therewith. Head 12 includes a shoulder or undersurface 13 which is planarly configured and normal to the longitudinal axis of shank 11. A tiered nut 14 is threaded onto shank 11 as indicated in FIG. 1. At the other extremity of bolt 10 there is a disposed a ferrule 15. Ferrule 15 includes a head 16 provided with retaining shoulder 17, a tapered portion 18, and a cylindrical portion 19 integral with tapered portion 18. Portion 19 has a cylindrical surface 20 which is preferably joined to tapered surface 21 of tapered portion 18 by a relief groove 22. Relief groove 22 is simply a break which aids in the disengagement of any part releasably mounted upon tapered portion 18 when it is desired to separate such part from the ferrule.

Ferrule 15 also includes a head recess 23 having upwardly facing tapered reaction surface 24. It is most important to note that the upwardly facing reaction surface 24 is not flat but rather is chamfered or conically shaped, protruding upwardly in a convex manner. For convenience of illustration the angle of upward protrusion has been exaggerated; the same should fall within a range of from 3°–5°, and preferably 4° relative to the plane normal to the horizontal axis of the bolt and the ferrule bore 25 within which bolt 10 is disposed.

The importance of this upwardly tapered, upwardly facing reaction surface 24 cannot be overemphasized since it is the provision of the same which reduces to a minimum the bearing contact of such surface with shoulder 13 of bolt 10, as it is the inner circumferential edge 26 alone, of the surface 24, which engages the underside of the bolthead. The surface contact between the ferrule and bolthead being at a minimum, there will hence exist between the bolthead and such surface a minimum of frictional drag. This allows the bolt 10 to be turned freely within ferrule 15, and without chancing rotation of the ferrule. Surface 26' is likewise preferably conically configured as a conical recess, seating the protruding conical end 27 of elastomeric friction sleeve 28. For proper seating, it is preferred that the slope of the conical surfaces, ferrule and friction sleeve at 26' be essentially 10° relative to a transverse plane passing normally through the longitudinal axis of ferrule 15. At this point, it may also be mentioned that there should be a corresponding cooperation as between the end of elastomeric friction sleeve 29 and the tiered nut 14 in FIG. 1, with the end of sleeve 29 fitting into the conical recess of the nut 14 in the manner indicated by the phantom line 30 in FIG. 1.

Ideally spacing the elastomeric friction sleeves 28 and 29 will be a nylon spacer 31, disposed over the bolt shank 11, for purposes hereinafter explained.

In returning to a consideration of the exterior periphery of the ferrule 15 and particularly at tapered portion 18, it is to be observed that to accommodate a tight fit wedging action as between the tapered portion 18 and any attachment member through which the tapered portion is thrust, for retention of such attachment member against revolvement, the tapered portion 18 should be nominally of the order of 2°. Kindly note the 2° designation in FIG. 2, as the angle between longitudinal peripheral line lying in the surface of tapered portion 18 and the longitudinal surface line A of cylindrical portion 19 of the ferrule.

In operation, the structure of FIGS. 1 and 2 will be thrust through an attachment member 30 and through a base member 29 and to which such attachment member is to be releasably secured. Prior to installation, the bolt 10 will be preliminarily tightened down slightly as to nut 14 so that some frictional retention will appear as between nut 14 and friction sleeve 29 and, correspondingly, with the remaining parts disposed upon shank of bolt 10.

The unit of FIG. 1 is then inserted through attachment member 30 and the combination thrust toward base member 29 such that the device of FIG. 1 is disposed within bore 31 of base member 29. The bolt 10 is then tightened down at head 12. It is to be noted that there is a minimum of friction existing as concerns the contact of inner peripheral edge 26 of ferrule with the underside of the bolthead 12. Accordingly, the bolt can be turned very easily to tighten down the nut without chancing the revolvement of the ferrule of any of those remaining parts disposed upon bolt 10. The friction of elastomeric sleeves 28 and 29 is sufficient to detain these in fixed condition against bolt revolvement.

To continue, the rotation of the bolt to force the nut 14 inwardly so as to compress the radially expandable, axially compressible, elastomeric friction sleeves 28 and 29 will cause these to expand outwardly to engage the bore wall at 31. This, in turn, will produce override of the inner adjacent edges E1 and E2 to wedge over the nylon spacer 31, so that there will be a wedging or biting action produced, further serving to increase the frictional retention of the elastomeric friction sleeves 28 and 29 within the bore 31. The presence of the taper existing at 26' relative to the ferrule and friction sleeve 28, and the taper existing at 30 between nut 14 and friction sleeve 29, will serve to "focus" or draw inwardly the friction sleeves relative to their associated rigid parts, so that a maximum axial loading can be achieved. Further, the presence of the ferrule cylindrical portion 19 within the attachment member 30 and the base or support 29 reinforces the shear strength of the bolt 10.

Again, the feature that makes the construction generally operative is the taper at the upwardly facing reaction surface of tapered reaction surface 24 and its limited frictional engagement with the underside of bolthead 12. This feature keeps the ferrule from turning despite the torque pressure urged against the head of the bolt. In addition, the flexible holding power of the elastomeric friction sleeves, in conjunction with the nylon washer 31, and rigid member contact as against these friction sleeves, keeps nut 14 from turning and hence permits the nut to be advanced to the left along the bolt shank as the bolt is being turned.

Shoulder 17 may serve as a reaction surface or simply as a shoulder, constituting a safety feature to ensure that despite the torquing of the bolt, disengagement as between attachment member 30 and ferrule 15 will not occur.

The ferrule structure is slightly modified in alternate embodiments of the present invention as shown in FIGS. 3–5.

In FIG. 3, ferrule 15A this time comprises a multipiece part, the same having tapered member 34, cylindrical member 35 and rubber bushing 36. Rubber bushing 36 serves as a frictional adjunct, frictionally joining, in effect, the two parts 34 and 35. Tapered member 34 includes a reaction shoulder 37 and also a top portion 38 provided with a convex, conically tapered portion 39. The degree of taper in this event should be from 3°–5° and preferably 4°, in the manner shown in FIG. 2 in connection with ferrule 15; thus, there will be a minimal frictional bearing contact as between the ferrule structure of FIG. 3 and the underside of the head of bolt 10. Angle B in FIG. 3 will be equivalent to that shown in FIG. 2, i.e., nominally 2°.

The structure of FIG. 4 illustrates a ferrule 15B, this time also a multipart structure having not only cylindrical member 35 and bushing 36 of FIG. 3, but also including a tapered member 37 provided with recessed bolthead seat 38. It will be understood that the seat 38 may be configured identically to the head recess 23 of ferrule 15 of FIG. 2, this so that the minimum frictional engagement as between the ferrule and the bolthead is preserved as at 26'' in FIG. 4.

The structure of FIG. 5 is similar to that shown in FIGS. 1 and 2, with the exception that the new ferrule 15C this time includes a countersink portion 38 to accommodate flush, countersunk configurations. For the general 82° taper of countersinking tools, countersink portion 38 should be tapered such that lines C and D, when extrapolated to intersection point 39, form an angle essentially 82° in magnitude. The tapered portion 40, between and contiguous with cylindrical portion 41 and countersink portion 42, will assume the nominally 2° taper previously described.

The structure of FIGS. 3–5 operates in identical manner to that heretofore described in connection with FIGS. 1 and 2.

As to FIG. 1, it is important to note that it is the wedging of the tapered portion 18 of ferrule 15 into attachment member 30, upon the torquing of the bolt 10 so as to draw up nut 14, that distorts outwardly the nominal cylindrical bore of attachment member 30.

While particular embodiments of the present invention have been shown and described, it will be obvious to those skilled in the art that changes and modifications may be made without departing from this invention in its broader aspects.

I claim:

A friction lock device for attaching an attachment member to support structure at aligned apertures thereof, said device including, in combination, a bolt having a bolthead provided with a transverse, planar undersurface and a threaded bolt shank integral with said bolthead and disposed centrally of said bolt shank, a ferrule mounted upon said shank proximate said bolthead, said ferrule having a central aperture receiving said shank and a forwardly tapered surface forming a bearing edge contiguous with and circumscribing said aperture and engaging said undersurface of said bolthead, said ferrule having an outwardly tapered peripheral sidewall increasing in diameter in the direction of said bolthead to define a wedging portion, as a bearing therefor, nut means threaded onto said shank, and elastomeric, axially compressible, radially expandable friction sleeve means mounted upon said shank between said ferrule and said nut.

2. The structure of claim 1 wherein said ferrule includes a bolthead-receiving recess terminating in said forwardly tapered surface.

3. The structure of claim 1 wherein said ferrule includes an outer convex extremity providing said forwardly tapered surface.

4. The structure of claim 1 wherein said ferrule comprises a ferrule member, a cylindrical member, and a friction bushing interposed between said ferrule member and said cylindrical member.

5. Structure according to claim 1 wherein said ferrule includes a cylindrical portion contiguous with said tapered ferrule portion.

6. Structure according to claim 1 wherein said friction sleeve means comprises a pair of friction sleeves and a spacer disposed therebetween, said spacer being of lesser outside diameter than said friction sleeves.

7. Structure according to claim 5 wherein said ferrule is provided with a peripheral groove proximate the juncture of said tapered ferrule portion and said cylindrical portion.

8. Structure according to claim 5 wherein said ferrule includes an outer, countersink portion forwardly of and contiguous with said wedging, outwardly tapered ferrule portion.

9. Structure according to claim 5 wherein said ferrule includes an outer, peripheral, rearwardly facing reaction shoulder.